United States Patent [19]
Schlagel

[11] Patent Number: 5,970,891
[45] Date of Patent: Oct. 26, 1999

[54] SEED PLANTER WITH GAUGE WHEELS AND CLOSING WHEELS HAVING HORIZONTAL FINGERS

[75] Inventor: Ronald L. Schlagel, Torrington, Wyo.

[73] Assignee: Schlagel Manufacturing, Inc., Torrington, Wyo.

[21] Appl. No.: 08/980,535

[22] Filed: Dec. 1, 1997

Related U.S. Application Data

[60] Provisional application No. 60/048,812, Jun. 5, 1997.

[51] Int. Cl.[6] .............................. A01B 49/04; A01C 5/00
[52] U.S. Cl. ........................... 111/135; 111/191; 172/555
[58] Field of Search .................................. 111/191, 193, 111/195, 135, 137; 172/540, 555

[56] References Cited

U.S. PATENT DOCUMENTS

| | | | |
|---|---|---|---|
| 3,212,585 | 10/1965 | Bezzerides | 172/540 X |
| 4,033,270 | 7/1977 | Bezzerides et al. | 172/540 X |
| 5,000,270 | 3/1991 | Phillips | 172/540 |
| 5,477,792 | 12/1995 | Bassett et al. | 111/191 X |

FOREIGN PATENT DOCUMENTS

| 92569 | 4/1962 | Denmark | 111/191 |
|---|---|---|---|

Primary Examiner—Christopher J. Novosad
Attorney, Agent, or Firm—Dean P. Edmundson

[57] ABSTRACT

A seed planter is described which includes a pair of gauge wheels having a plurality of spaced fingers in generally-horizontal planes. The gauge wheels do not pack the surface of wet soil. In another embodiment, there are provided closing wheels which include spaced fingers on the periphery. The closing wheels are able to close the slot in the soil without forming a hardened crust on the soil. Use of the closing wheels and the gauge wheels enables the planting of seeds in soils which contain higher levels of moisture than normally permissible.

17 Claims, 12 Drawing Sheets

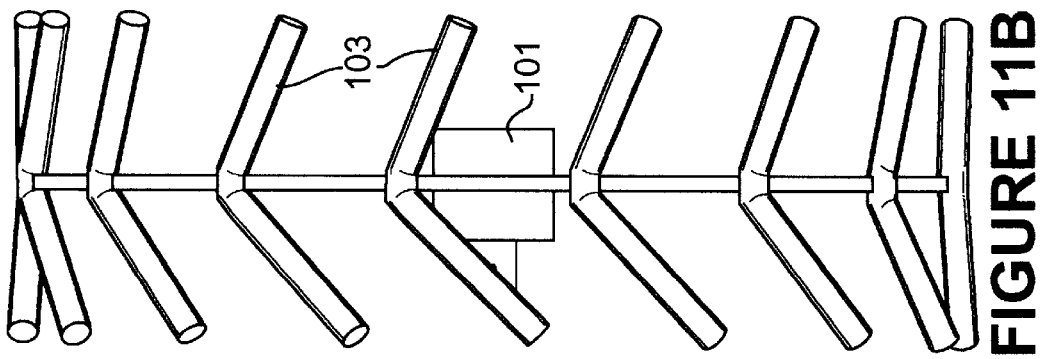
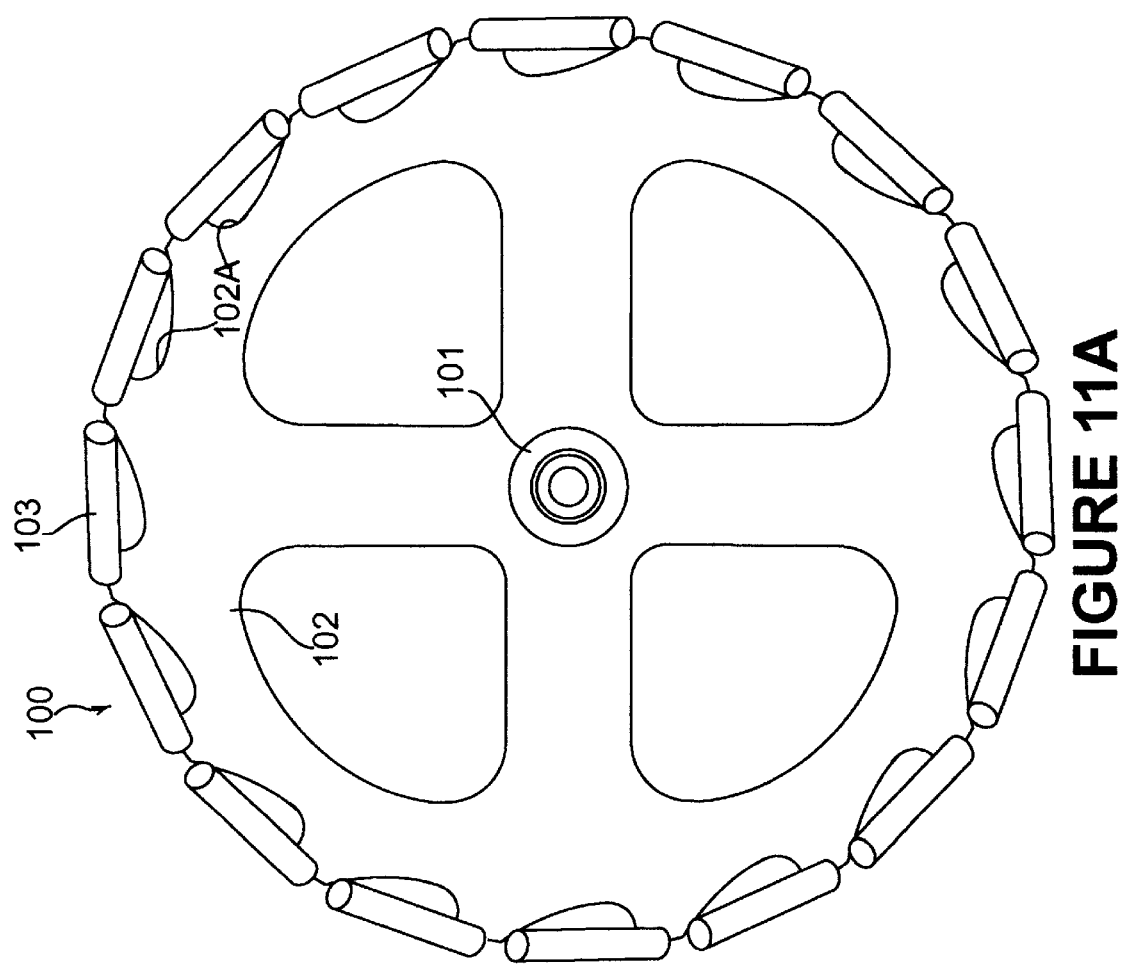
FIGURE 11B
FIGURE 11A

SEED PLANTER WITH GAUGE WHEELS AND CLOSING WHEELS HAVING HORIZONTAL FINGERS

CROSS-REFERENCE TO RELATED APPLICATION

This application is based on, and claims priority from, my provisional application Ser. No. 60/048,812, filed Jun. 5, 1997.

FIELD OF THE INVENTION

This invention relates to seed planting equipment. More particularly, this invention relates to equipment for planting seeds, for example, for row crops (e.g., corn, beans, sugar beets, etc.) or for planting grain seeds (e.g., wheat, barley, oats, etc.).

BACKGROUND OF THE INVENTION

Planting equipment has long been used for planting seeds, for example, for row crops. Typically the planter includes one or more seed hoppers and opening disks for opening a V-shaped slot in the soil for seed placement. Gauge wheels on the planter determine the maximum planting depth, and closing wheels behind the opening disks are responsible for closing the V-shaped slot in the soil after the seeds have been placed therein.

Conventional gauge wheels comprise smooth rubber tires or wheels which pack and compact the soil adjacent to the slot formed in the soil by the opening disks. The closing wheels also have a smooth periphery. As a result, the closing wheels also pack and compact the soil adjacent the slot.

When the soil contains too much moisture, the effect of the gauge wheels and the closing wheels is to compact the soil and leave a very smooth surface. As the soil dries, a very tough soil crust is formed which restricts or prevents the growing seedling from emerging through the surface of the soil. This is very undesirable.

As a result of the foregoing problems, conventional planters cannot be used for planting seeds in soils which are too wet.

There has not heretofore been provided a planter having the features and advantages provided by the present invention.

SUMMARY OF THE INVENTION

In accordance with the present invention there is provided an improved gauge wheel system for use on a conventional row crop seed planter which enables the planter to be used in wet soils without undesirably compacting the soil.

In another embodiment of the invention, there is provided an improved closing wheel system for use on planters such as row crop seed planters. The novel closing wheel system is also beneficial for use in wet soils.

When the new gauge wheel system and the new closing wheel system are used in combination on the same planter, additional benefits are observed.

The new gauge wheel system comprises a pair of wheels which are rotatably mounted on the planter, wherein the periphery of each wheel includes a plurality of spaced fingers in generally-horizontal planes. Preferably the fingers are equidistantly spaced around the periphery of the wheel. The length of the fingers, and the diameter, may vary.

The fingers contact the soil at spaced locations, thus firming the seed bed but not leaving a smooth surface. The surface of the seed bed is left with loose soil particles and small clods that dry at different rates, thereby preventing crusting of the seed bed.

The gauge wheels are preferably positioned adjacent to the soil-opening disks on the planter such that the fingers on the gauge wheels are in close proximity to (or in slight contact with) the outer surface of a respective closing disk for the purpose of removing soil which may stick to the outer surface of each opening disk.

The new closing wheel system also comprises a pair of wheels which are rotatably mounted on the planter, wherein the periphery of each wheel includes a plurality of spaced fingers. Preferably the fingers are equidistantly spaced around the periphery of the wheel. The length and diameter of the fingers may vary.

The fingers break the V-shaped slot in the soil intermittently so as to avoid side-wall compaction in the slot. Loose soil with small clods are left on the soil surface. This loose soil promotes uneven drying of the top inch of the seed bed preventing crusting, with the added benefit of preserving the moisture. Below the top inch of soil where the seed is planted, uniform germination of the seeds is possible.

Other features and advantages of the improved seed planters of the invention will be apparent from the following detailed description and the accompanying drawings.

BRIEF DESCRIPTION OF THE DRAWINGS

The invention is described in more detail hereafter with reference to the accompanying drawings, wherein like reference characters refer to the same parts throughout the several views and in which:

FIGS. 11A and 11B are rear and side elevational views of another embodiment of a gauge wheel of this invention;

DETAILED DESCRIPTION OF THE INVENTION

Figure 1:
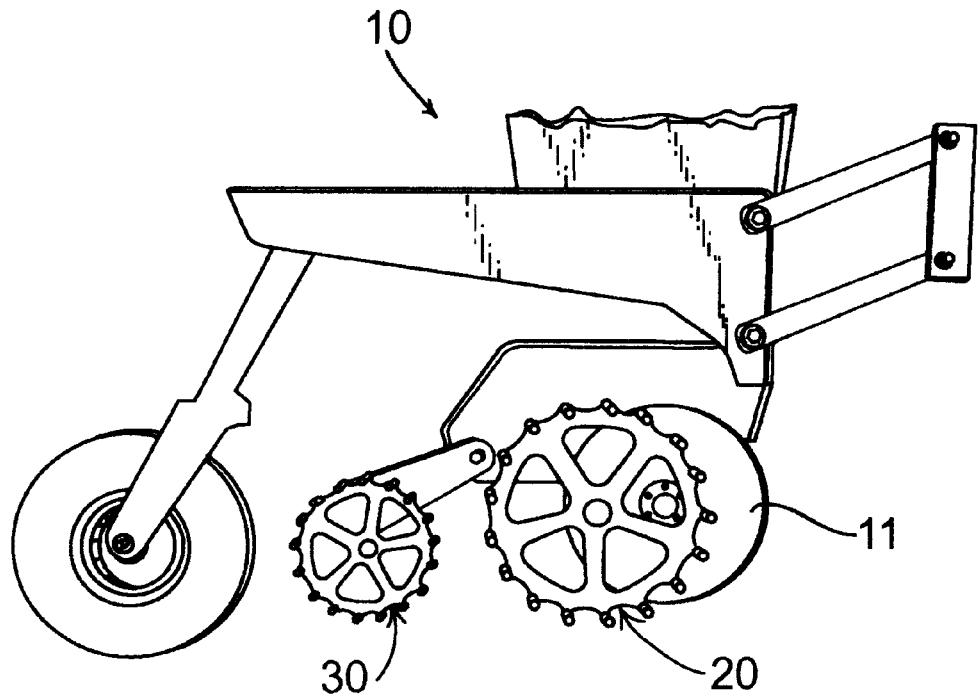
FIG. 1 is a side elevational view of a seed planter which includes the novel gauge wheels and closing wheels of this invention.
Figure 2:
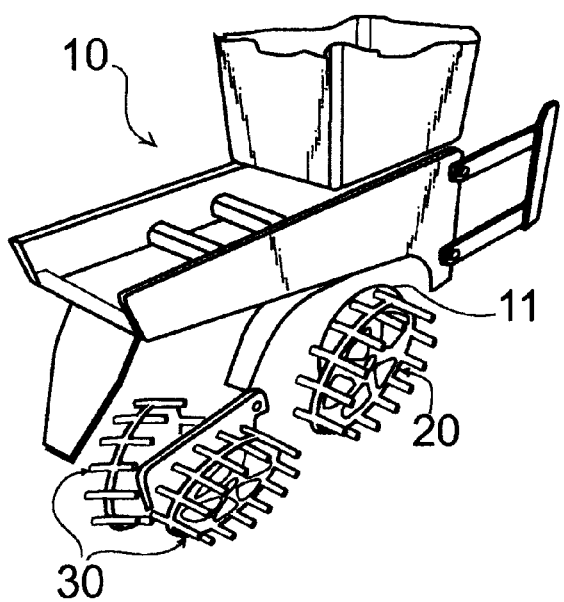
FIG. 2 is a rear perspective view of the planter shown in FIG. 1.
Figure 3:
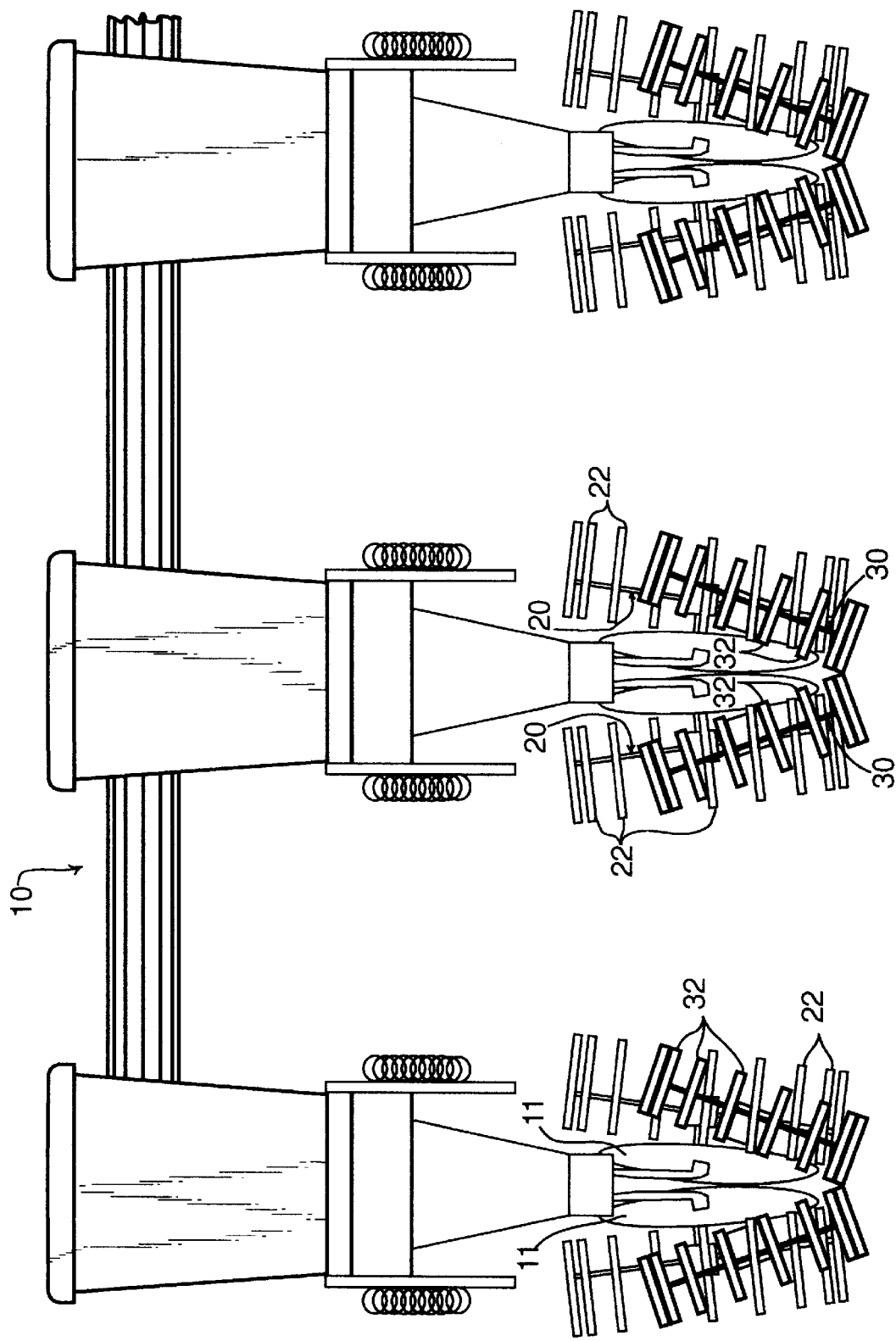
FIG. 3 is a rear elevational view of a planter which includes the novel gauge wheel and closing wheels of the invention.
Figure 4B:
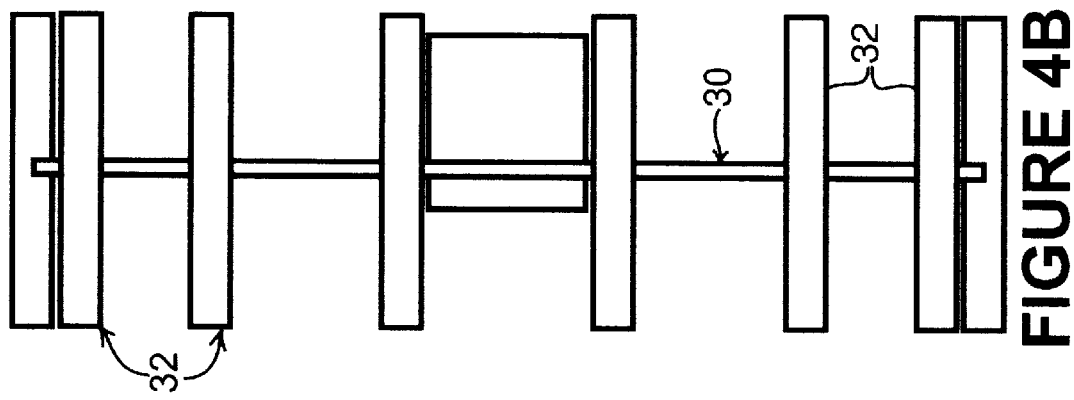
FIGS. 4A and 4B are side elevational and front elevational views of a closing wheel of the invention.
Figure 4A:
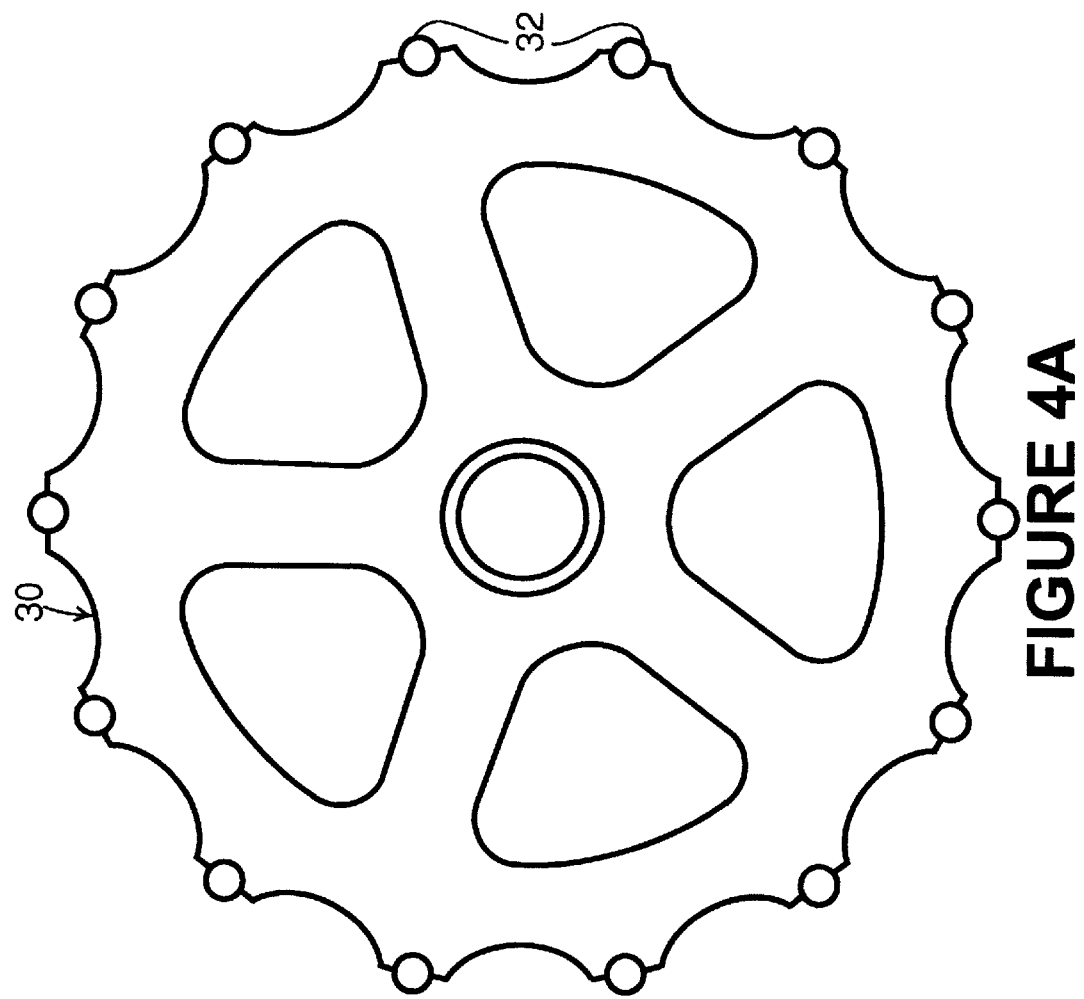
Figure 5B:
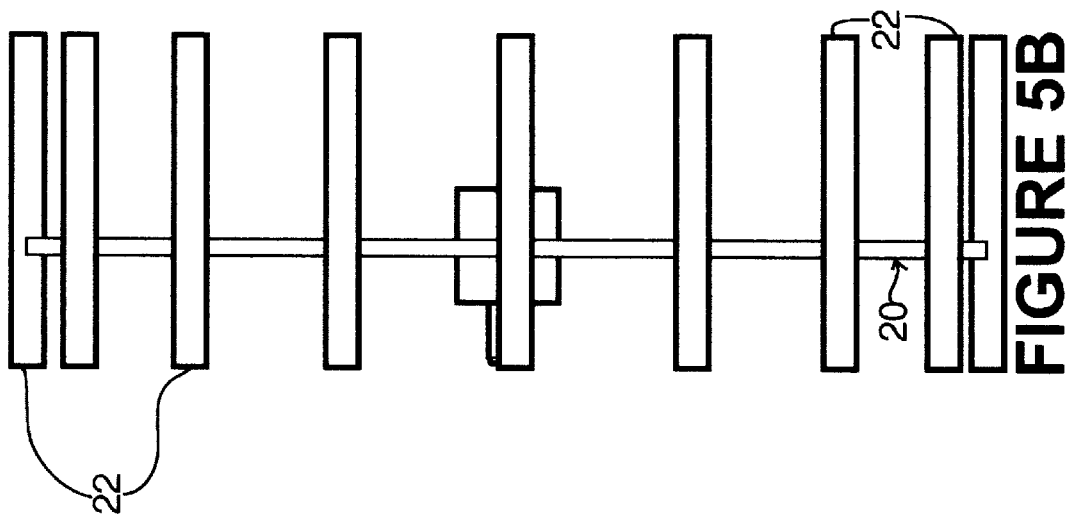
FIGS. 5A and 5B are side elevational and front elevational views of a gauge wheel of the invention.
Figure 5A:
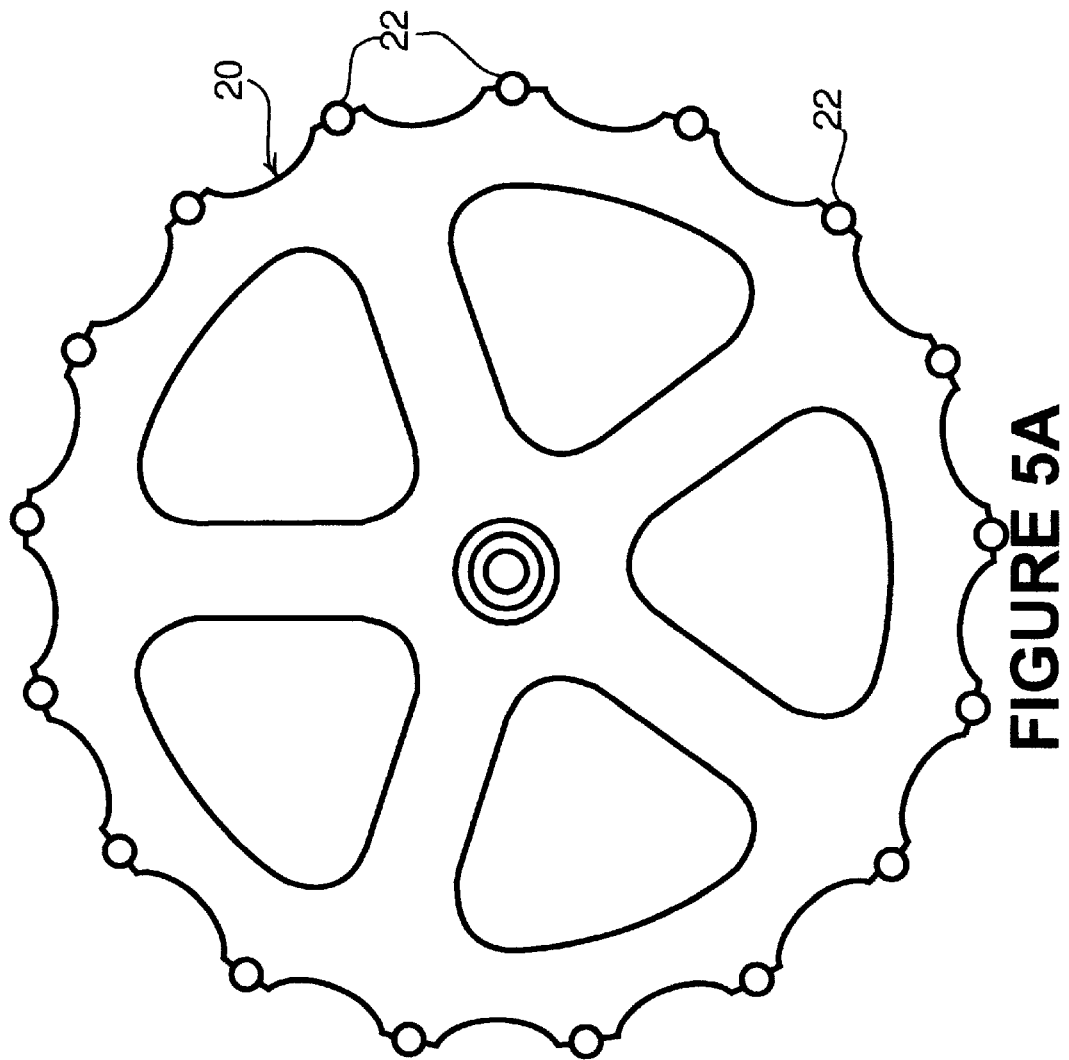

In the drawings there is illustrated a row crop seed planter 10 which includes the novel gauge wheel system and closing wheel system of the invention. The gauge wheels are used in pairs, with one such wheel being located on each side of the opening disks 11 or other means used to form a V-shaped slot in the soil for seed placement. The novel gauge wheels each comprise a rim 20 on whose periphery there is secured a plurality of spaced fingers 22. The length and diameter of the fingers may vary. For example, the length may be about 4 to 7 inches, and the diameter is in the range of about 0.25 to 0.75 inch. The spacing of the fingers is preferably equidistant around the periphery of the wheel, e.g., in the range of about 0.50 to 3 inches.

The closing wheels are also used in pairs, with one such wheel being located on each side of the slot in the soil. The closing wheels each comprise a rim 30 on whose periphery there is secured a plurality of spaced fingers 32. The length of the fingers may vary, e.g., from about 3 to 6 inches the diameter may also vary, e.g., from about 0.25 to 0.75 inch. The spacing between adjacent fingers is preferably equidistant and may be, for example, about 0.5 to 2.5 inches.

Preferably the closing wheels are tilted or angled in the manner shown in the drawings such that the bottom edges of the wheels are closer together than the top edges. This arrangement is beneficial in closing the slot in the soil.

Figure 6B:
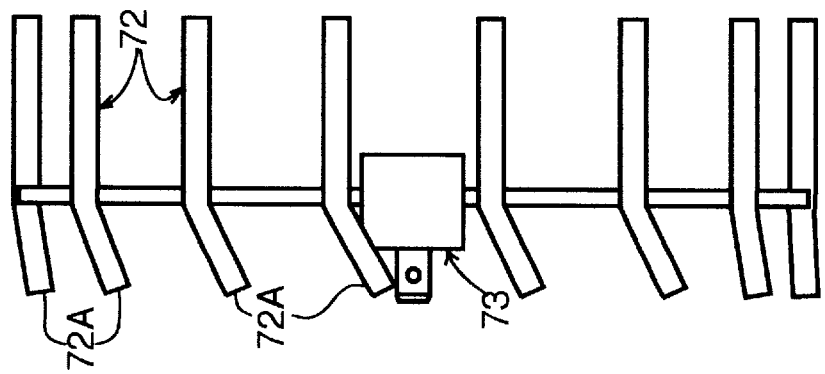
FIGS. 6A, 6B and 6C are rear and side elevational views of another embodiment of a gauge wheel of this invention.
Figure 6C:
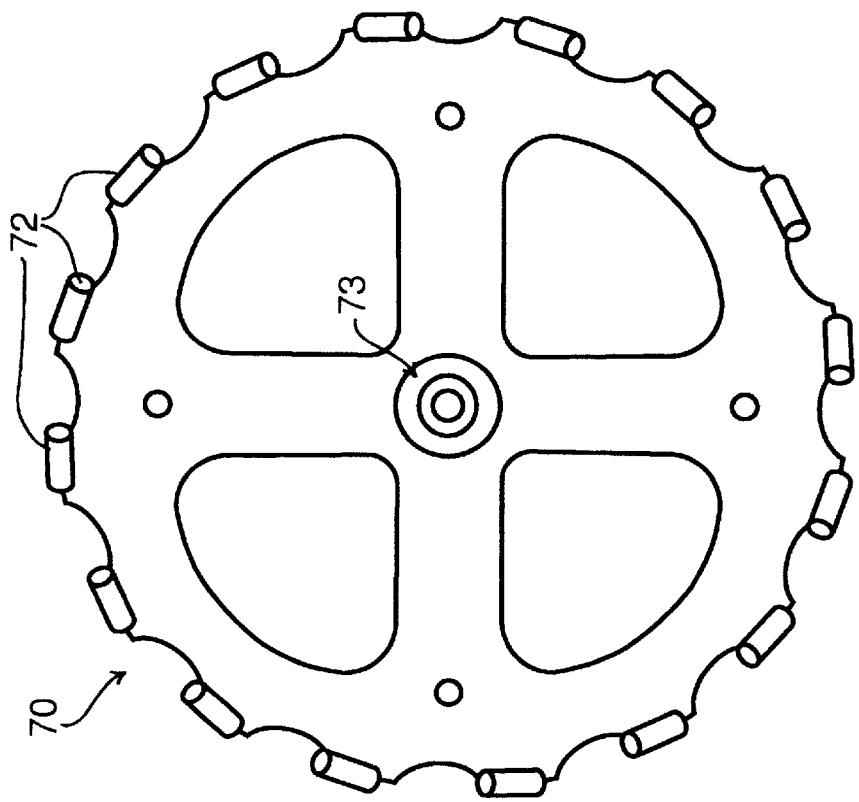
Figure 6A:
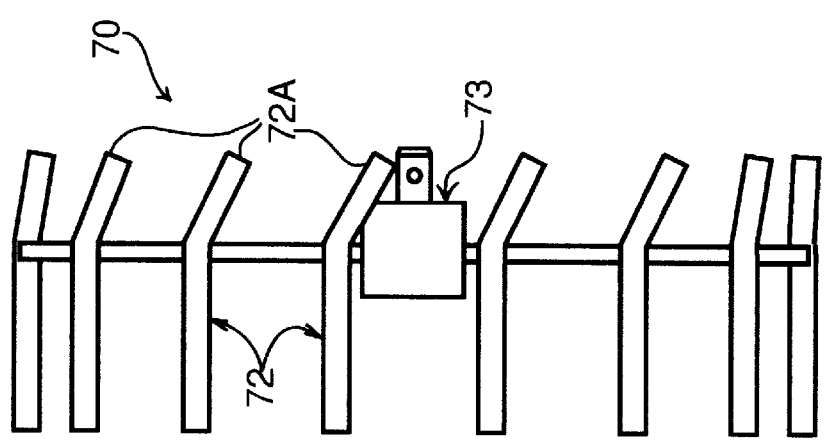

Another embodiment of a gauge wheel system of this invention is illustrated in FIGS. 6A, 6B and 6C. In this embodiment, the ends 72A of the fingers 72 on the inside of the gauge wheel 70 (i.e., adjacent the opening disks which form the slot in the ground for the seeds) are bent or angled toward the rear of the planter. This embodiment is desirable when planting in fields which have high residue conditions because the angled fingers tend to shed trash which would otherwise catch on the fingers. Each wheel 70 includes a central hub assembly 73.

Preferably the gauge wheels are mounted on the planter in close proximity to the outer surface of a respective opening disk. This enables the fingers on each gauge wheel to remove soil which may stick to the outer surface of a respective opening disk.

Figure 7C:
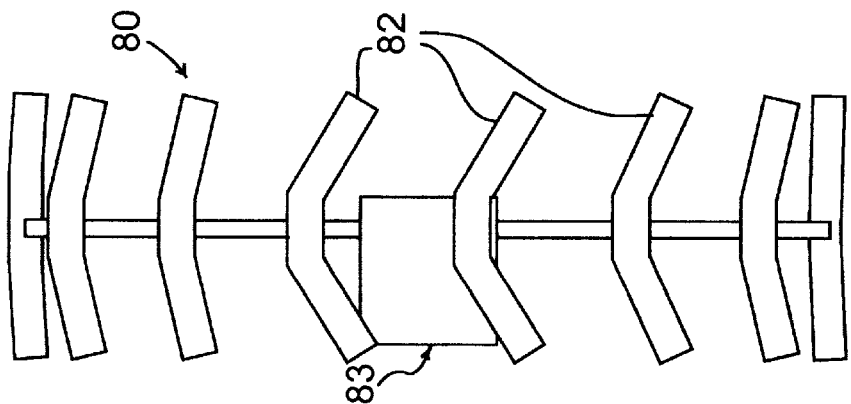
FIGS. 7A, 7B and 7C are rear and side elevational views of another embodiment of a closing wheel of this invention.
Figure 7B:
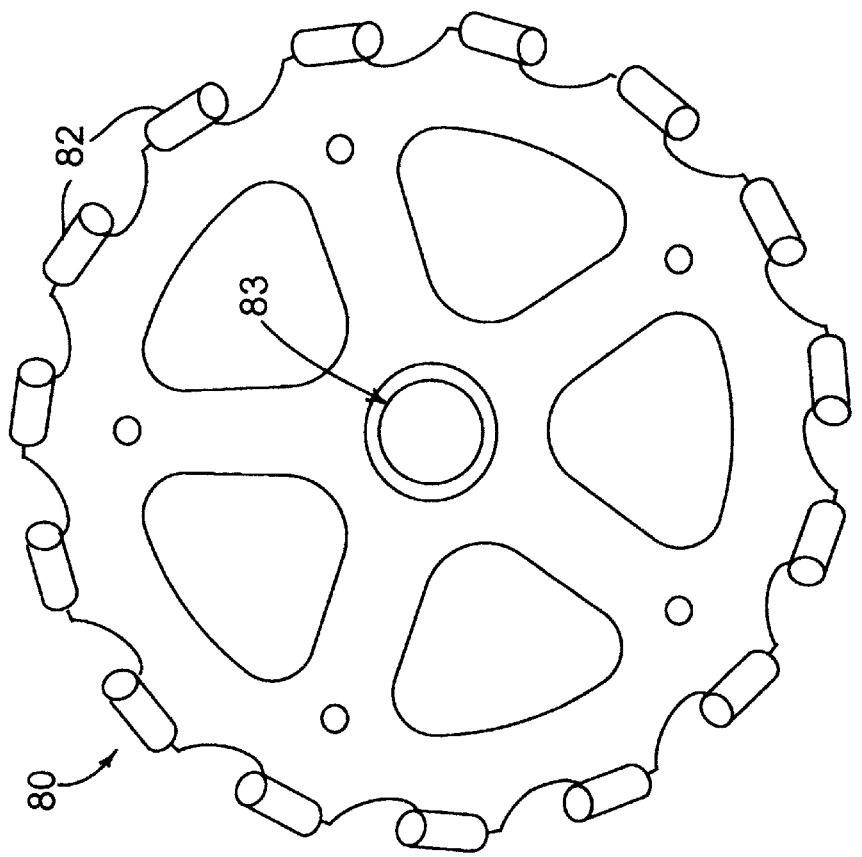
Figure 7A:
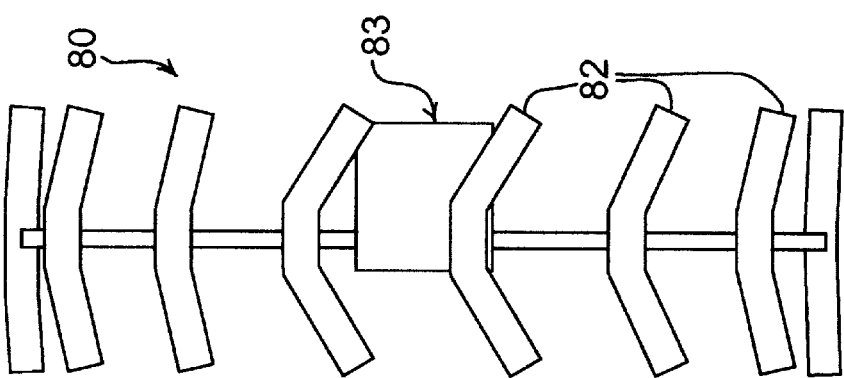

Another embodiment of closing wheel 80 is illustrated in FIGS. 7A, 7B and 7C. In this embodiment, the ends of the fingers 82 on both sides of the wheel are bent or angled toward the rear of the planter. This embodiment is desirable for use in fields having high residue conditions because the angled fingers tend to shed trash which would otherwise catch on the fingers. Each wheel 80 includes a central hub assembly 83.

Figure 8B:
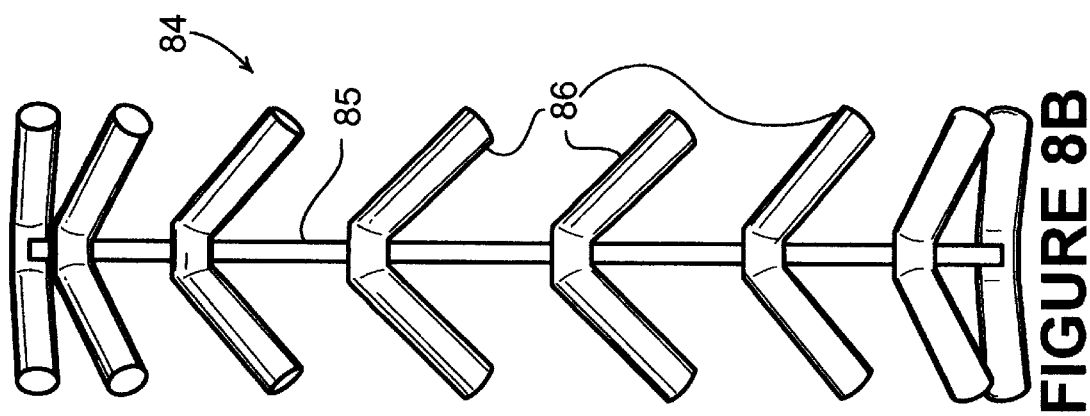
FIGS. 8A and 8B are rear and side elevational views of another embodiment of a closing wheel of this invention.
Figure 8A:
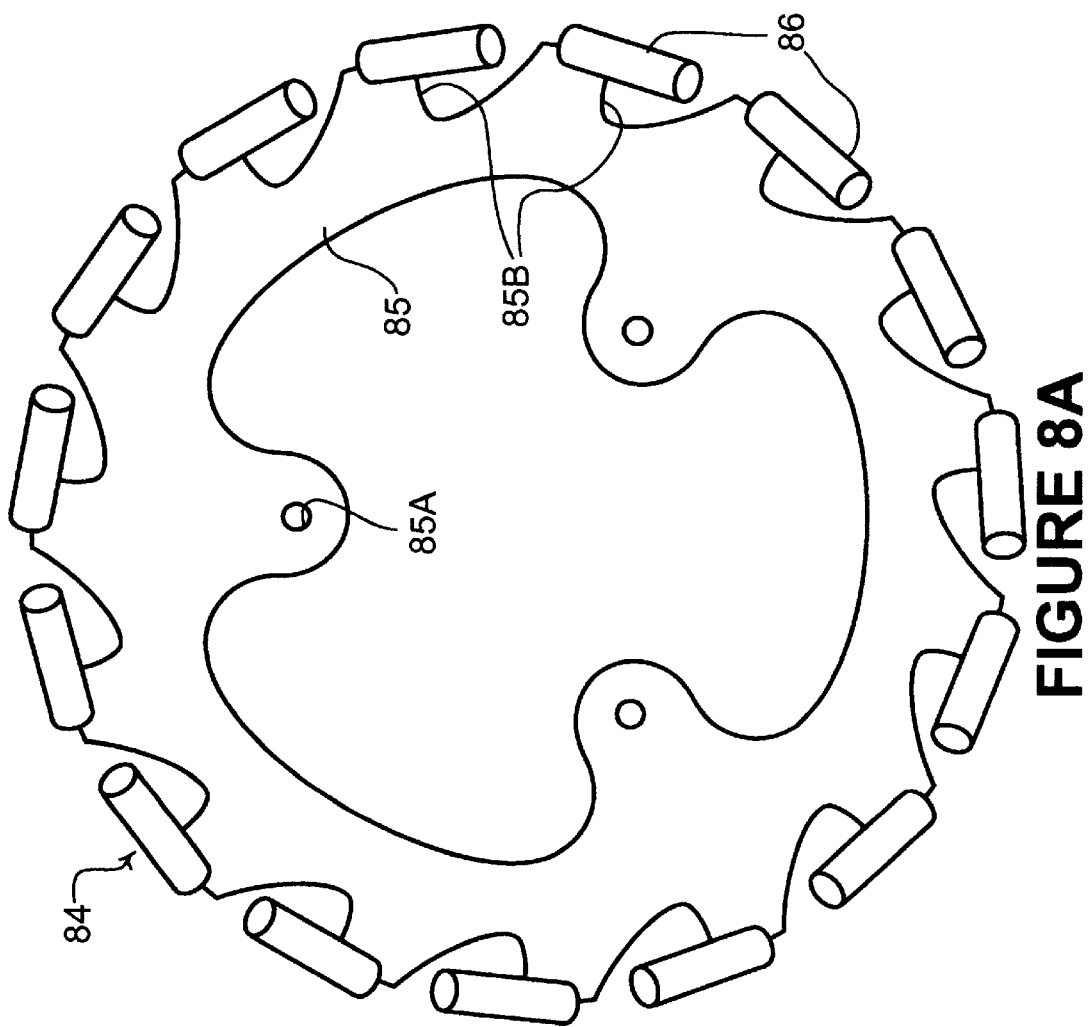

Yet another embodiment of closing wheel 84 is shown in FIGS. 8A and 8B. This wheel comprises a rim 85 with access openings 85A to enable the wheel to be easily bolted to a central hub on a planter. This feature facilitates replacing broken or worn parts. The outer periphery of the wheel has secured thereto a plurality of spaced apart fingers 86. Preferably both ends of the fingers are angled rearwardly, as shown, for the purpose of shedding trash as the planter moves through the field.

Another important feature of the closing wheel 84 is the provision of a notch or recess 85B in the rim 85 rearwardly of each finger 86. The depth of the notch may vary (e.g., from about 0.5 to 2 inches or more). The shape of the notch may be referred to as a half-teardrop shape. The depth of the notch immediately rearward of the finger 86 is deeper than the depth of the notch near the following finger. Other shapes for the notch (e.g., semi-circular) could also be used. The purpose of the notches is to prevent soil build-up on the closing wheel.

Figure 9B:
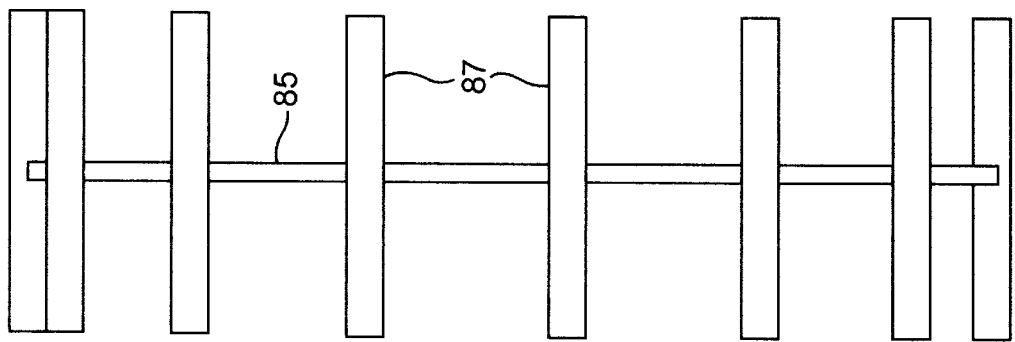
FIGS. 9A and 9B are rear and side elevational views of another embodiment of a closing wheel of this invention.
Figure 9A:
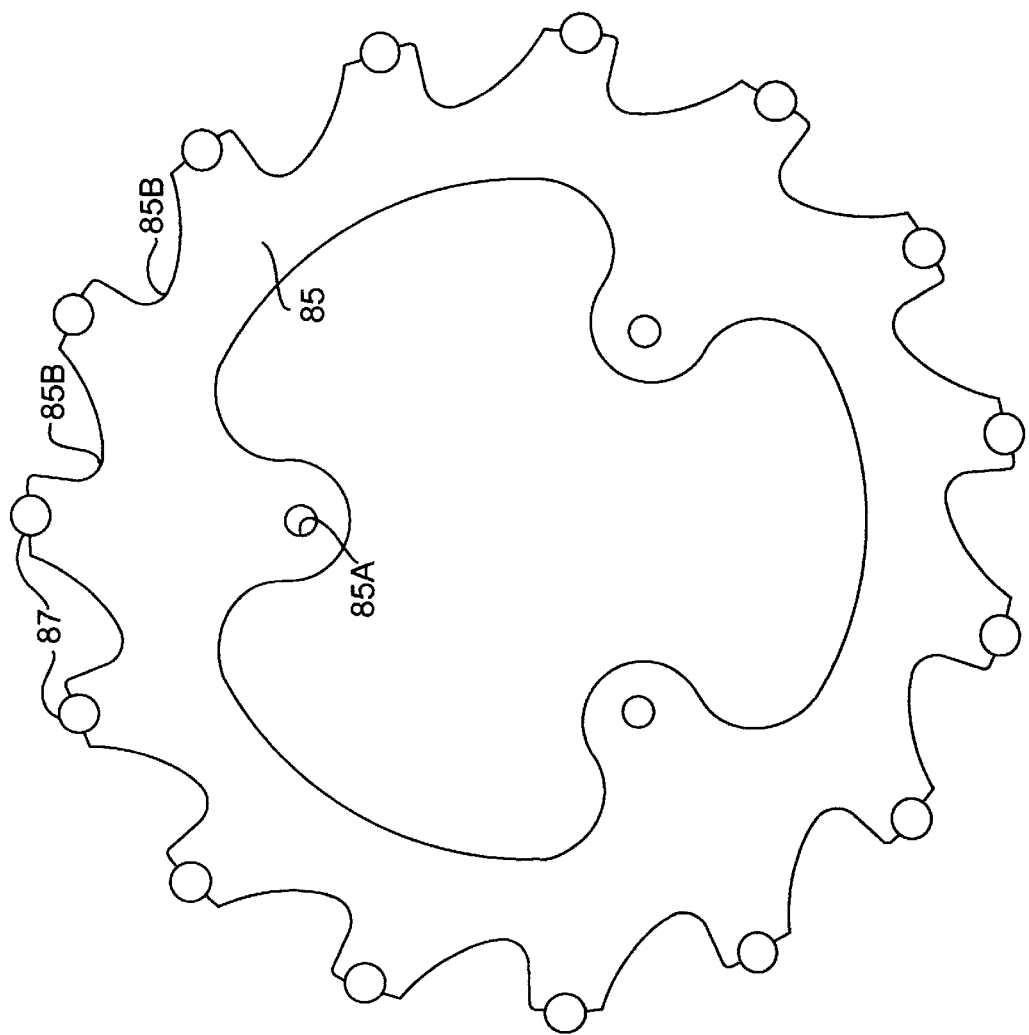

Another variation of the closing wheel is shown in FIGS. 9A and 9B where straight rods 87 are secured to the periphery of the rim 85 at spaced locations. A notch 85B of the same shape shown in FIG. 8A is located rearwardly of each finger 87.

Figure 10B:
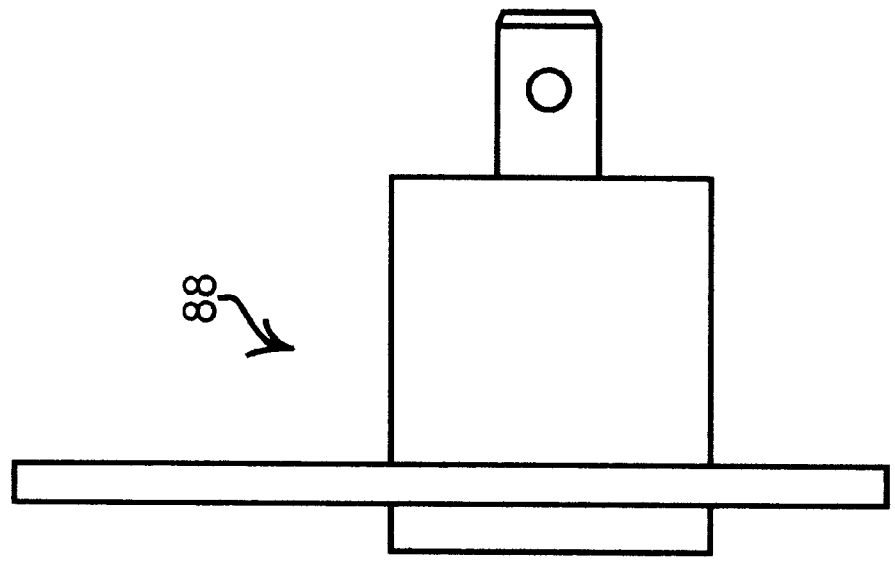
FIGS. 10A and 10B are rear and side elevational views of a hub assembly which is useful in combination with the closing wheel of FIGS. 9A and 9B.
Figure 10A:
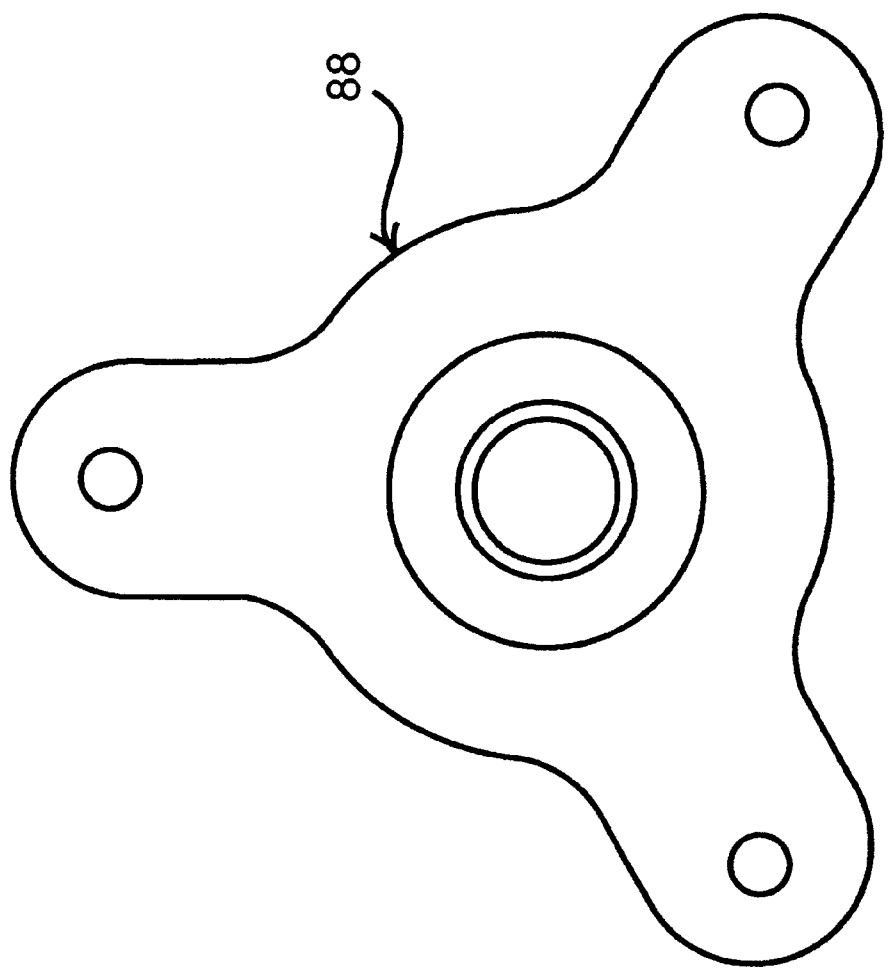

FIGS. 10A and 10B show the type of hub assembly 88 which is useful for mounting the closing wheels shown in FIGS. 8A, 8B, 9A and 9B.

FIGS. 11A and 11B show another embodiment of a gauge wheel 100 which is useful in this invention. There are a plurality of spaced fingers 103 secured to the periphery of the wheel. One end of each finger is angled rearwardly to a greater extent than its other end. A notch or recess 102A is located in the rim 102 rearwardly of each finger.

Figure 12B:
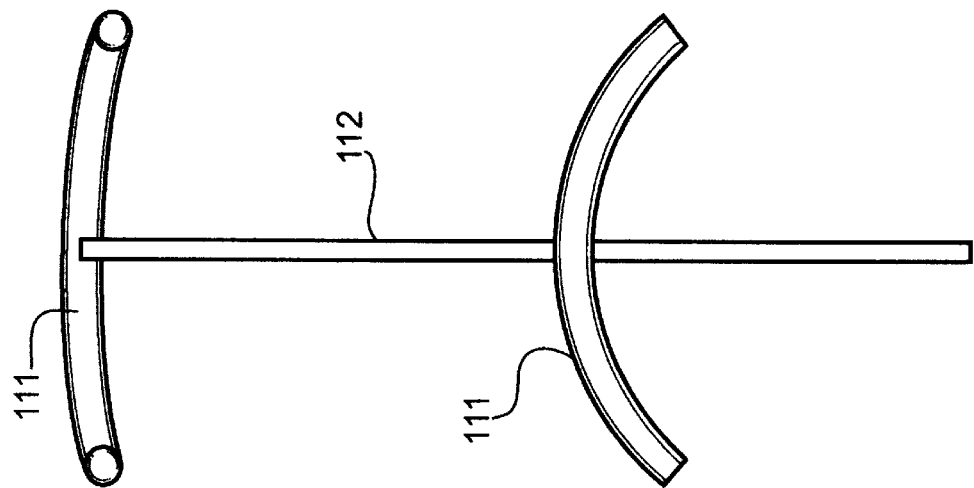
FIGS. 12A and 12B are rear and side elevational views of another embodiment of a single closing wheel of this invention for use on a planter.
Figure 12A:
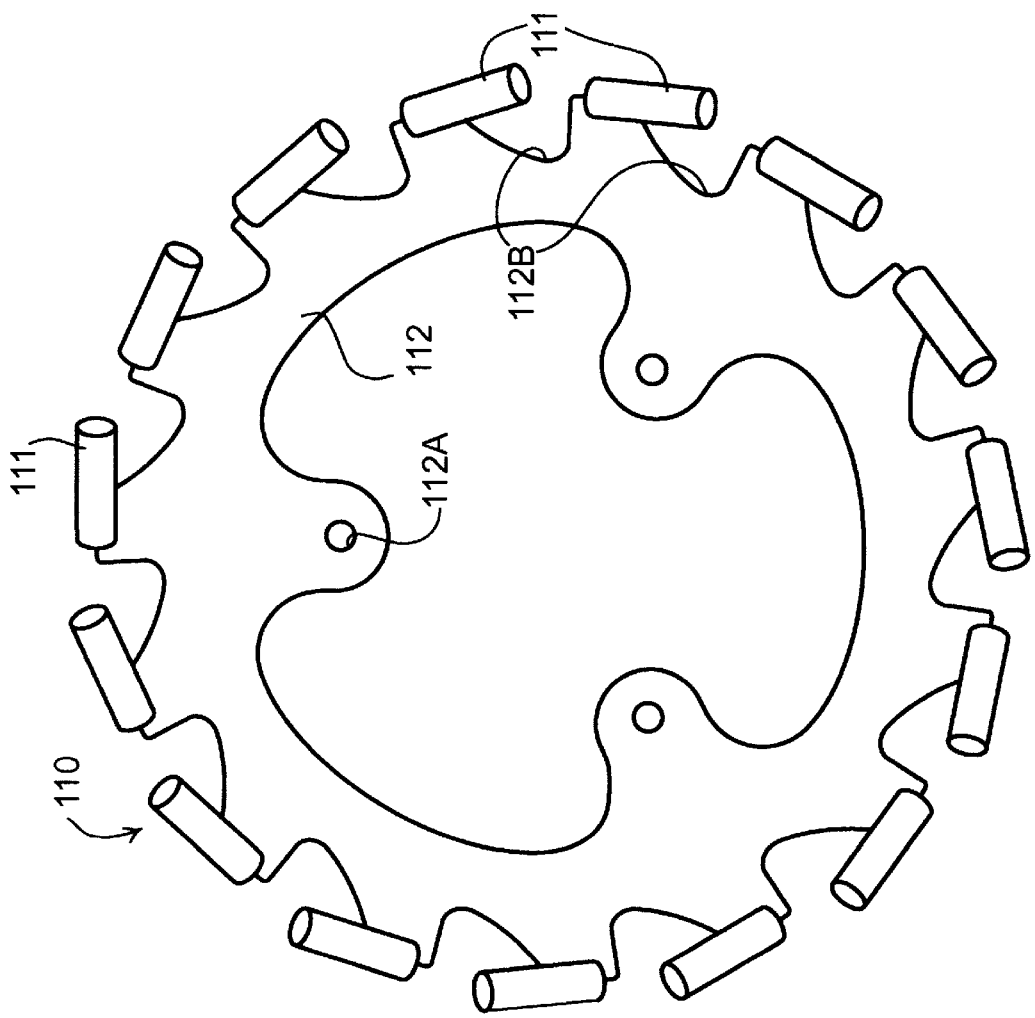

FIGS. 12A and 12B show another embodiment of a closing wheel 110 comprising rim 112 with a plurality of rearwardly angled fingers 111 on its periphery. Openings 112A enable the wheel to be bolted to a hub on a planter. The rim also includes a notch or recess 112B rearwardly of each finger 111, as shown. This type of closing wheel is useful on some types of planters (e.g., Case International) where only a single closing wheel per row is required. The length of each finger in this version may be, for example, up to about 8 inches, and each finger may be curved or angled in a variety of manners.

Figure 13B:
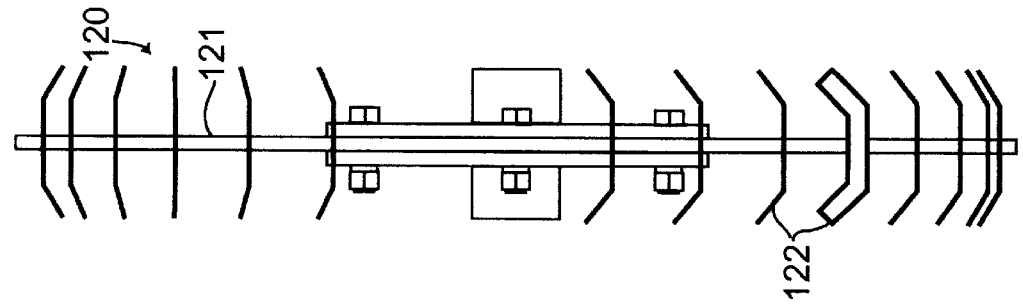
FIGS. 13A and 13B are rear and side elevational views of another embodiment of closing wheel which is useful for use on a grain drill.
Figure 13A:
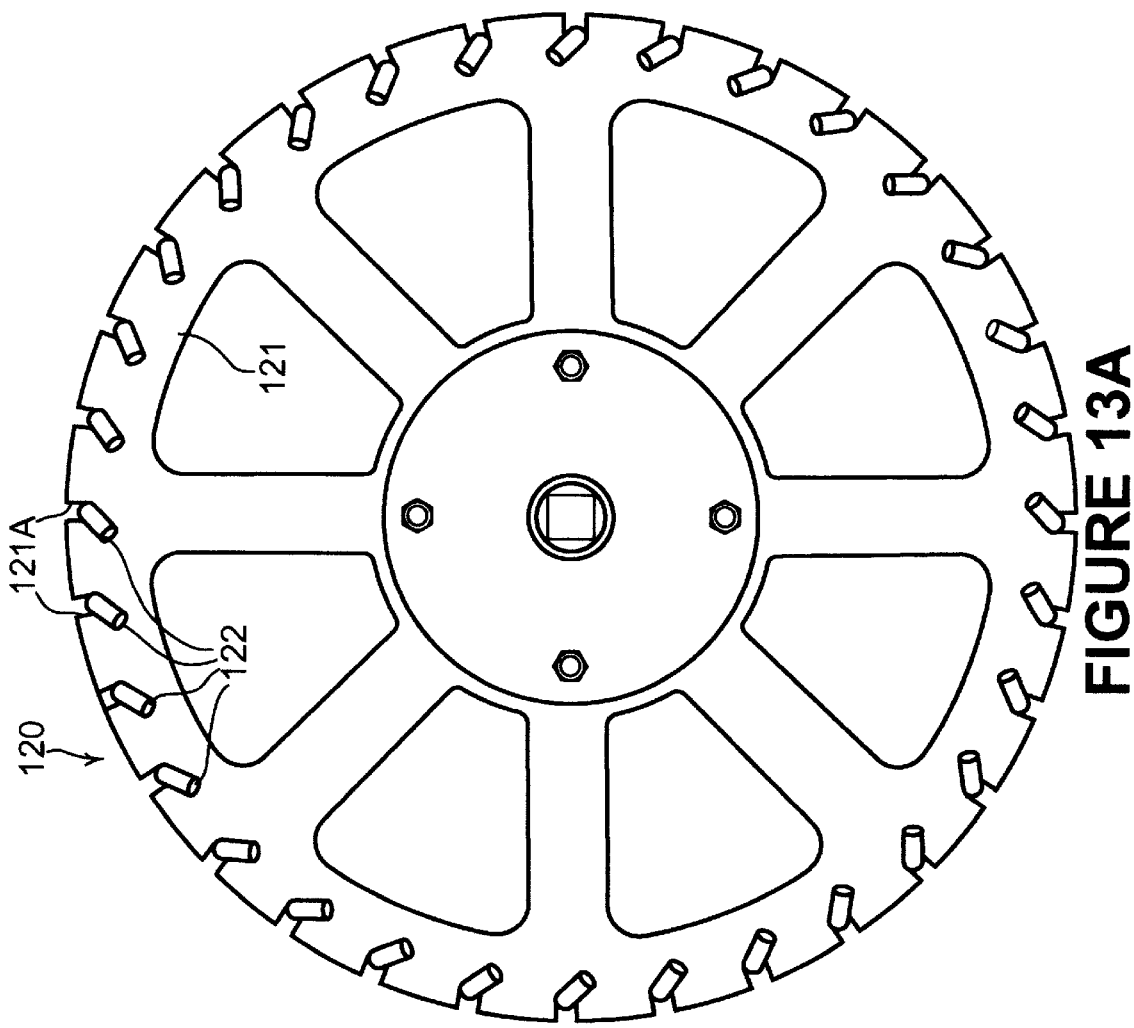

FIGS. 13A and 13B show a closing wheel 120 which is useful on a grain drill. The wheel comprises a plate or rim 121 having a plurality of notches 121A in its periphery. In each notch there is secured a finger 122. The outer ends of each finger are angled rearwardly. This closing wheel is especially useful on a grain drill for closing the slot in the ground after seeds have been placed therein. The length and diameter of the fingers may vary. For example, the length may be about 2 to 7 inches, and the diameter of the wheels may also vary, e.g., from about 12 to 36 inches.

Other variants are possible without departing from the scope of this invention.

What is claimed is:

1. In a row crop seed planter having opening disks for opening a slot in the soil for placement of seeds, an improvement which comprises a pair of gauge wheels carried by said planter for controlling the maximum depth of seed placement in the soil, wherein the gauge wheels are rotatably mounted on said planter; wherein the periphery of each said wheel has secured thereto a plurality of spaced fingers in generally-horizontal planes.

2. The planter in accordance with claim 1, wherein each said wheel is mounted on a horizontal axis, and wherein said fingers are parallel to said axis.

3. The planter in accordance with claim 1, wherein said fingers are equidistantly spaced around the periphery of said wheel.

4. The planter in accordance with claim 3, wherein the spacing between adjacent fingers is in the range of about 0.50 to 3 inches.

5. The planter in accordance with claim 1, wherein each said finger has a length in the range of about 4 to 7 inches and a diameter in the range of about 0.25 to 0.75 inch.

6. The planter in accordance with claim 1, wherein the periphery of each said gauge wheel includes a recessed area rearwardly of each said finger.

7. The planter in accordance with claim 1, wherein each finger includes first and second ends, and wherein said first end is angled rearwardly.

8. The planter in accordance with claim 1, wherein each of said fingers includes a first end which is angled rearwardly.

9. In a row crop seed planter having opening disks for opening a slot in the soil for placement of seeds, an improvement which comprises a pair of closing wheels carried by the planter for closing said slot, wherein the closing wheels are rotatably mounted on said planter, wherein the periphery of each said wheel has secured thereto a plurality of spaced fingers; wherein said fingers on each said wheel are parallel to each other, and are equidistantly spaced around the periphery of said wheel.

10. The planter in accordance with claim 9, wherein said fingers have a length in the range of about 3 to 6 inches and a diameter in the range of about 0.25 to 0.75 inch.

11. The planter in accordance with claim 9, wherein the spacing between adjacent fingers is in the range of about 0.5 to 2.5 inches.

12. The planter in accordance with claim 9, wherein said wheels in said pair include bottom edges, and wherein said wheels are angled towards each other at said bottom edges.

13. The planter in accordance with claim 9, further comprising a pair of gauge wheels for controlling the maximum depth of seed placement in the soil, wherein the gauge wheels are rotatably mounted on said planter; wherein the periphery of each said gauge wheel has secured thereto a plurality of spaced fingers in generally-horizontal planes.

14. A planter in accordance with claim 9, wherein the periphery of each said closing wheel includes a recessed area rearwardly of each said finger.

15. The planter in accordance with claim 9, wherein each said finger includes first and second ends, and wherein said first end is angled rearwardly.

16. The planter in accordance with claim 15, wherein both of said ends are angled rearwardly.

17. In seed planter having opening disks for opening a slot in the soil for placement of seeds, an improvement which comprises a closing wheel carried by the planter for closing said slot, wherein said closing wheel is rotatably mounted on said planter, wherein the periphery of each said wheel has secured thereto a plurality of spaced fingers; wherein each said finger is in a generally-horizontal plane.

* * * * *